Dec. 15, 1953   R. L. WILSON   2,662,782
TRAILER WHEEL ASSEMBLY
Filed Sept. 19, 1951   2 Sheets-Sheet 1
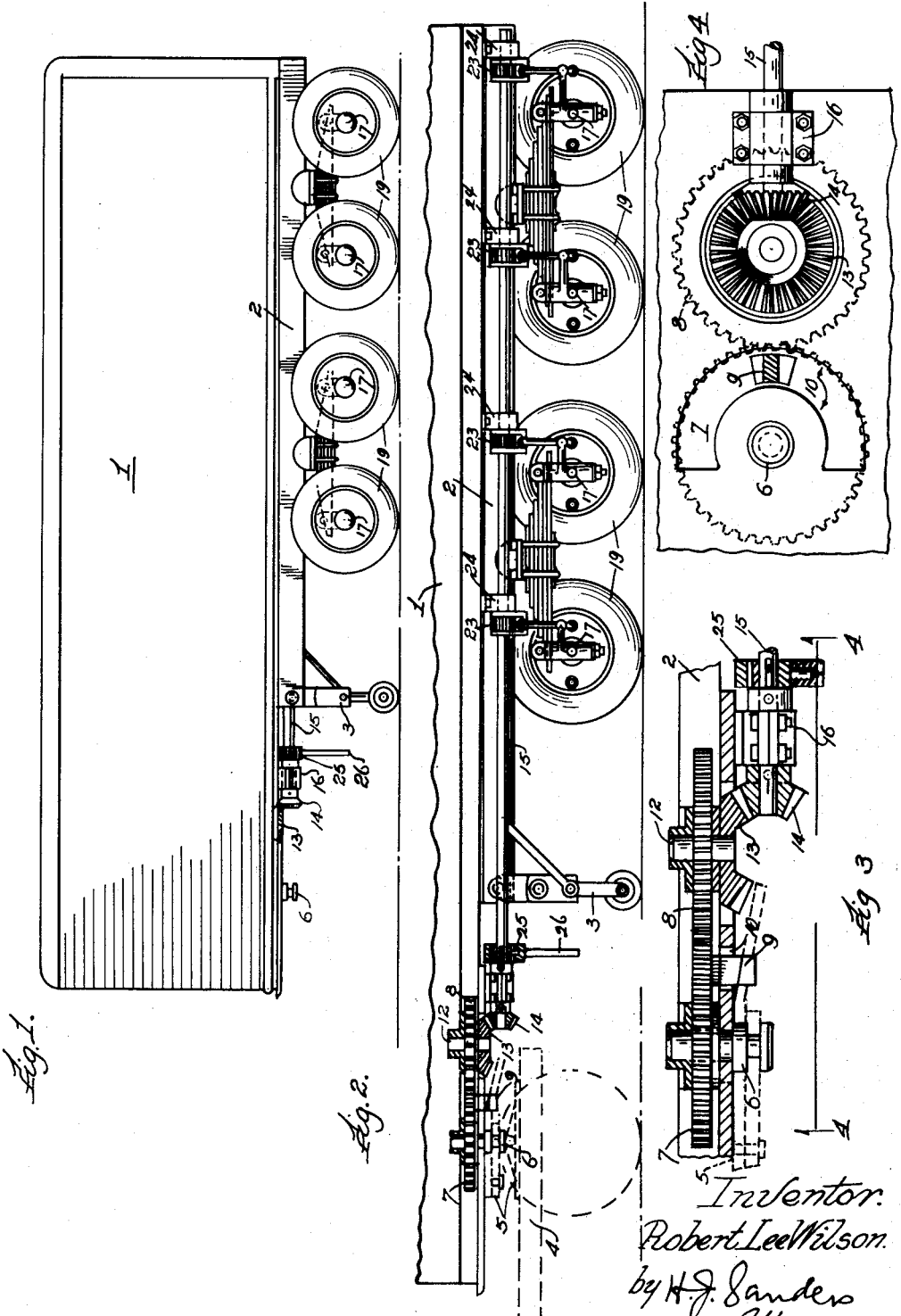
Inventor:
Robert Lee Wilson
by H. J. Sanders
Attorney.

Dec. 15, 1953  R. L. WILSON  2,662,782
TRAILER WHEEL ASSEMBLY
Filed Sept. 19, 1951  2 Sheets-Sheet 2
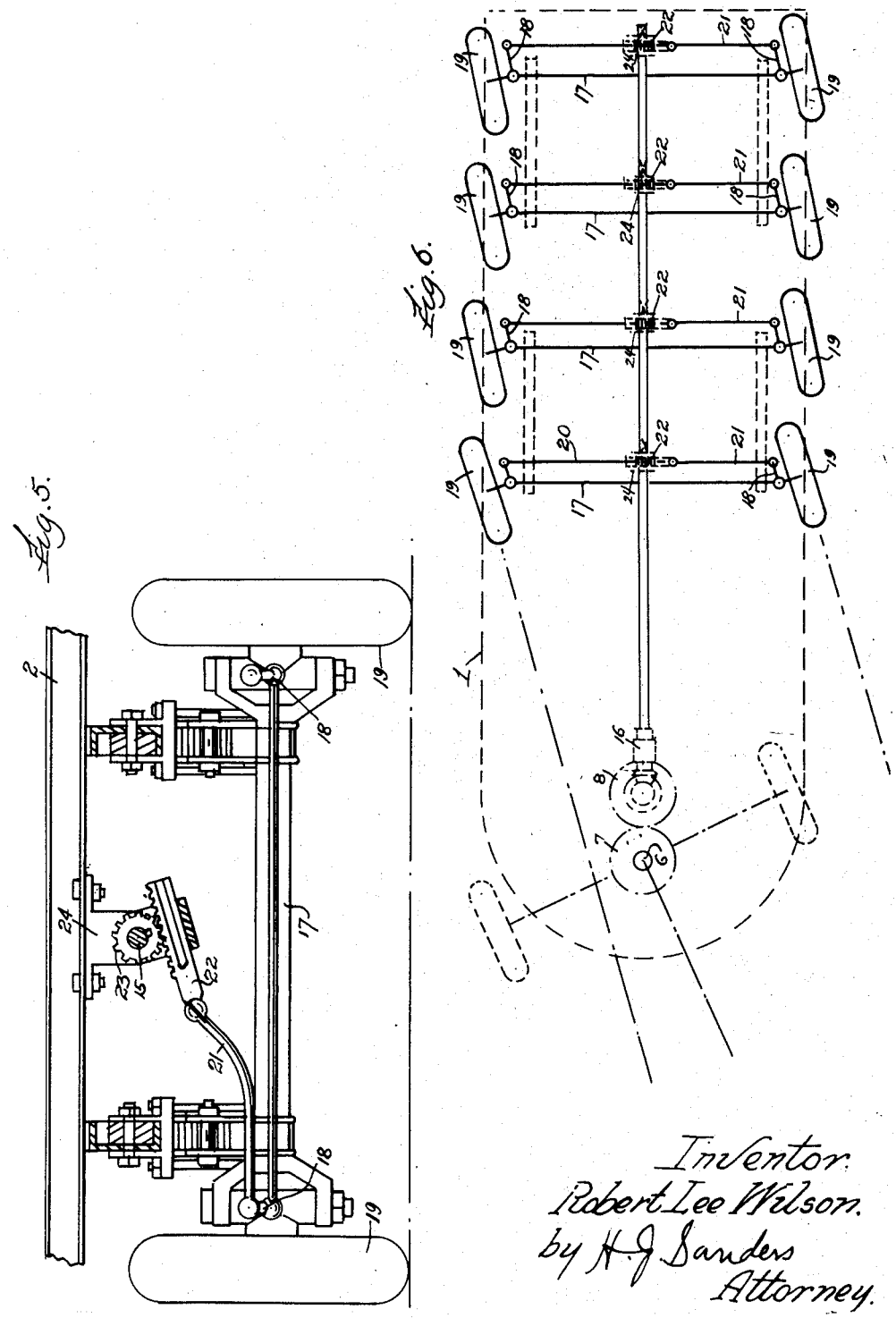
Inventor
Robert Lee Wilson.
by H. J. Sanders
Attorney.

Patented Dec. 15, 1953

2,662,782

UNITED STATES PATENT OFFICE 2,662,782

TRAILER WHEEL ASSEMBLY

Robert L. Wilson, Chicago, Ill.

Application September 19, 1951, Serial No. 247,322

2 Claims. (Cl. 280—426)

1

This invention relates to trailer vehicle structures and more particularly to short turn wheel assemblies for trailers. One object is to provide a trailer structure having an improved overall weight distribution thus contributing materially to safety in operation and reducing damage to highways travelled by the vehicles.

A further object is to provide a trailer structure having improved braking features that facilitate and assure quick stops in emergency and greatly reduce the liability to skidding. A still further object is to provide a short turn wheel assembly that facilitates turning of corners, as well as making curves in the road, and that permits backing up easily.

A still further object is to provide a trailer vehicle particularly adapted to heavy duty, high speed operation with safety. A presently preferred form of trailer steering mechanism and various structural features thereof involving my invention are hereinafter more fully described and claimed and a trailer steering mechanism embodying my invention is shown in the accompanying drawings forming part of this disclosure and in which—

Fig. 1 is a side view of a trailer embodying my invention.

Fig. 2 is an enlarged view in side elevation of a portion of Fig. 1, the wheels at one side of the vehicle being omitted, part of the steering gear being shown in section, and a portion of a tractor associated therewith denoted in broken lines.

Fig. 3 is a further enlarged view of a portion of the steering mechanism of Fig. 3 per se.

Fig. 4 is a view of Fig. 3 in elevation, taken approximately on the line 4—4 thereof.

Fig. 5 is an enlarged view of one set of trailer wheels with associated mechanism, and Fig. 6 is a diagrammatic plan view illustrating the angular positions of the wheels when changing direction of travel of the vehicle.

The reference numeral 1 denotes the body of the vehicle, 2 the wheel-supported chassis, 3 the retractable front end support and 4 a portion of the rear end of a tractor having a conventional fifth wheel 5. Depending from the trailer 1 is the king bolt 6 which is integral with the axle of the gear wheel 7 horizontally disposed and carried operatively in the base, beneath the floor, of the trailer, the gear wheel 7 in mesh with the transmission wheel 8, the gear 7 provided with the depending drive key 9 disposed in the fifth wheel slot 10, the transmission wheel 8 carried by the trailer, the axle of said transmission wheel having fast thereon the bevel gear 13 in mesh with

2 the bevel pinion 14 fast upon the transmission shaft 15 extending longitudinally of the trailer and operative in bearings 16 secured to the chassis.

Conventional axles 17 are connected at their ends to steering knuckles 18 connected to vehicle wheels 19, the wheels operatively connected also by the knuckles to the tie rods 20. Also connected operatively to the knuckles 18 upon one side of the chassis are the steering rods 21 that at their inner ends carry racks 22 in mesh with pinions 23 fast to the transmission shaft 15, the racks and the portions of the steering rods adjacent same being obliquely disposed, the racks being operatively supported in bearings 24 supported by and depending from the vehicle chassis. Steering knuckles of the forward pair of wheels 19 are shorter than any of the other knuckles and the knuckles rearwardly of the forward pair taken successively are progressively longer to compensate for the distances of the wheels from the turning point at the front end of the vehicle.

In making a turn the fifth wheel of the tractor causes rotation of the forward gear wheel 7 which rotates transmission wheel 8 which through bevel gear 13 rotates the pinion 14 that rotates the transmission shaft 15 which through the pinions 23 moves the racks 22 to turn the vehicle wheels 19 to properly follow in the path of the tractor.

Fast upon the shaft 15 adjacent its forward end is the reversible ratchet 25 with lever 26 to facilitate manual movement of that shaft to facilitate connection of the drive key 9 with the fifth wheel when, for some reason, the trailer and tractor, then separated, may be out of line with each other and coupling being otherwise difficult. When the drive key 9 and king bolt 6 are properly engaged with the tractor fifth wheel 5 a turn of the tractor will cause the key 9 to ride against a wall of the fifth wheel slot 10 which will cause rotation of the gear wheel 7 which will rotate the transmission wheel 8 and the previously described mechanism operatively connected thereto.

What is claimed is:

1. In a vehicle having a rigid chassis, a rotary transmission shaft extending longitudinally of said chassis, wheels for said chassis, wheel axles, steering knuckles connecting said wheels to said axles, tie rods connecting said knuckles together in pairs, pinions fast to said transmission shaft, steering rods secured to said steering knuckles, racks connecting said steering rods to said pinions, a bevel pinion fast to one end of said transmission shaft, a gear wheel carried by the vehicle, a transmission wheel carried by the vehicle in mesh with said gear wheel, a bevel gear carried by said transmission wheel in mesh with said bevel pinion, a drive key carried by said gear wheel for disposal in the fifth wheel slot of a tractor, and a king bolt integral with said gear wheel received in said fifth wheel.

2. In a vehicle including a chassis, a rotary transmission shaft extending longitudinally of said chassis, wheels for said chassis, wheel axles spaced apart from the longitudinal center of said chassis to the rear end thereof, steering knuckles connecting said wheels to said axles, tie rods connecting said knuckles in pairs, pinions fast to said transmission shaft, said steering knuckles being progressively longer from the center to the rear of said chassis, steering rods secured to said steering knuckles, racks connecting said steering rods to said pinions, a bevel pinion fast to one end of said transmission shaft, a gear wheel carried by the vehicle, a transmission wheel carried by the vehicle in mesh with said gear wheel, a bevel gear carried by said transmission wheel in mesh with said bevel pinion, a drive key carried by said gear wheel for disposal in the fifth wheel slot of a tractor, and a king bolt integral with said gear wheel received in said fifth wheel.

ROBERT L. WILSON.

References Cited in the file of this patent

UNITED STATES PATENTS

| Number | Name | Date |
|---|---|---|
| 660,291 | Dull | Oct. 23, 1900 |
| 2,007,504 | Schelben | July 9, 1935 |
| 2,121,705 | Leines | June 21, 1938 |
| 2,342,697 | Runyan | Feb. 29, 1944 |

FOREIGN PATENTS

| Number | Country | Date |
|---|---|---|
| 183,510 | Great Britain | Aug. 3, 1922 |
| 419,422 | Great Britain | Nov. 12, 1934 |